United States Patent
Oh et al.

(10) Patent No.: US 11,181,761 B2
(45) Date of Patent: Nov. 23, 2021

(54) MODULAR FIXTURE FOR DISPLAY DEVICE

(71) Applicant: DELL PRODUCTS, LP, Round Rock, TX (US)

(72) Inventors: Guentaek Oh, Singapore (SG); Jeongki Kim, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/780,826

(22) Filed: Feb. 3, 2020

(65) Prior Publication Data
US 2021/0240030 A1   Aug. 5, 2021

(51) Int. Cl.
*G02F 1/1333* (2006.01)

(52) U.S. Cl.
CPC .. *G02F 1/133308* (2013.01); *G02F 1/133322* (2021.01)

(58) Field of Classification Search
CPC ............... G02F 1/133308; G02F 2001/133322
See application file for complete search history.

(56) References Cited

U.S. PATENT DOCUMENTS

| | | | | |
|---|---|---|---|---|
| 2007/0076139 A1* | 4/2007 | Bae | ................... | G02F 1/133308 349/58 |
| 2012/0268868 A1* | 10/2012 | Yoon | ................. | G02F 1/133308 361/679.01 |
| 2012/0293728 A1* | 11/2012 | Yokohama | ........... | G02B 6/0088 348/739 |
| 2015/0124191 A1* | 5/2015 | Yu | ..................... | G02F 1/133308 349/58 |
| 2020/0201121 A1* | 6/2020 | Huang | .............. | G02F 1/133308 |
| 2020/0249528 A1* | 8/2020 | Zhang | .................. | G02B 6/0081 |

* cited by examiner

*Primary Examiner* — Nathanael R Briggs
(74) *Attorney, Agent, or Firm* — Larson Newman, LLP

(57) ABSTRACT

A display device has alignment features that compensate for variability in open cells sourced from different vendors. A backlight is arranged behind or beneath an open cell to illuminate picture elements. The open cell and the backlight rest or reside within a cover shield. Because the open cell may have supplier variability, the cover shield has receptacles such as holes or apertures that align with features protruding from a module fixture. The modular fixture thus allows the open cell and the backlight to be arranged, aligned, and/or assembled to the covert shield, despite the supplier variability in the open cell.

20 Claims, 13 Drawing Sheets

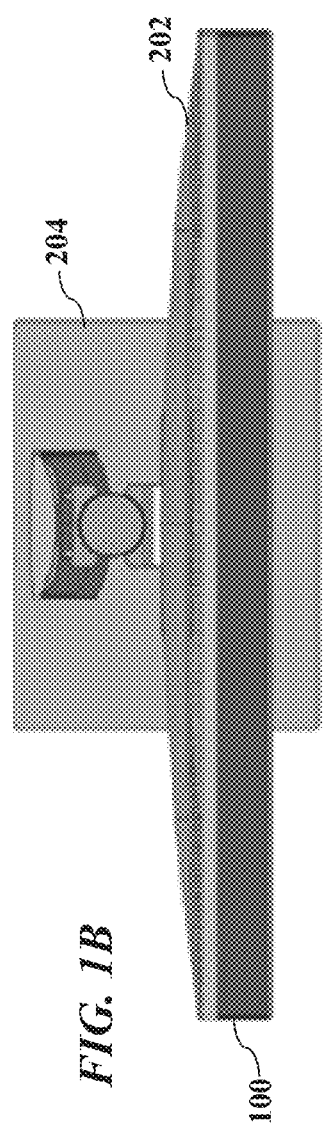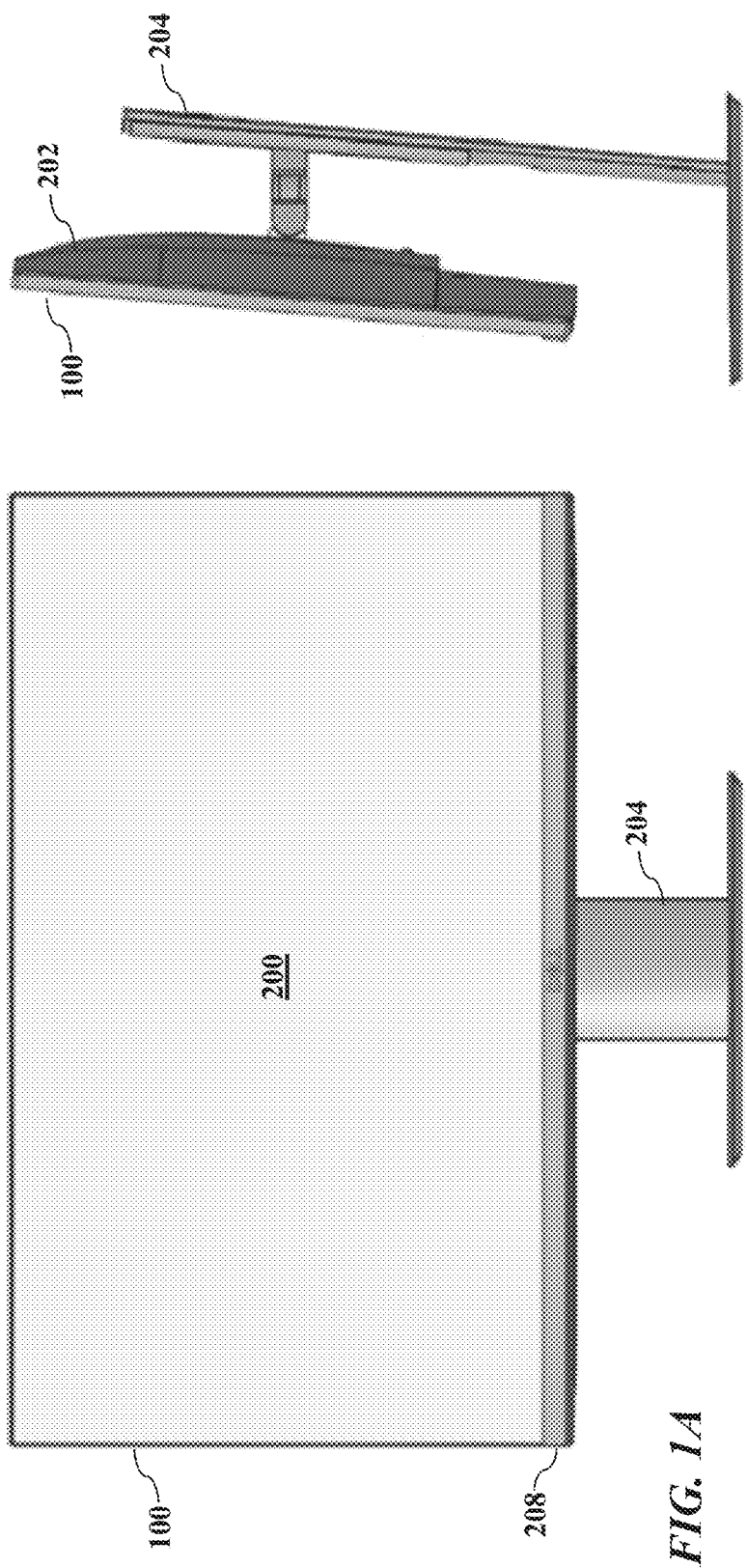

MODULAR FIXTURE FOR DISPLAY DEVICE

FIELD OF THE DISCLOSURE

This disclosure generally relates to display devices, and more particularly relates to a modular fixture for assembling a display device.

BACKGROUND

Display devices for computers, servers, mobile smartphone, and other information handling systems may have different vendors. Any display device, for example, may be manufactured using LED/LCD display modules sourced from different suppliers. Because each vendor's display module may have slightly different physical characteristics, different assembly tooling may be required. Each vendor's display module, as an example, may have different positions, quantities, and/or structures for chip-on-flex connections. These various chip-on-flex connections force a manufacturer or assembler of the display device to utilize different assembly fixtures, depending on the supplier of the display module. Tooling expenses are high, and fixture changeovers consume time and additional expense.

SUMMARY

A display device has alignment features that compensate for variability in open cells sourced from different vendors. A backlight is arranged behind or beneath an open cell to illuminate picture elements. The open cell and the backlight rest or reside within a cover shield. Because the open cell may have supplier variability, the cover shield has receptacles that align with features protruding from a module fixture. The modular fixture thus allows the open cell and the backlight to be arranged, aligned, and/or assembled to the covert shield, despite the supplier variability in the open cell.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIGS. 1A-C, 2, and 3 are illustrations of a display device, according to exemplary embodiments;

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 2:
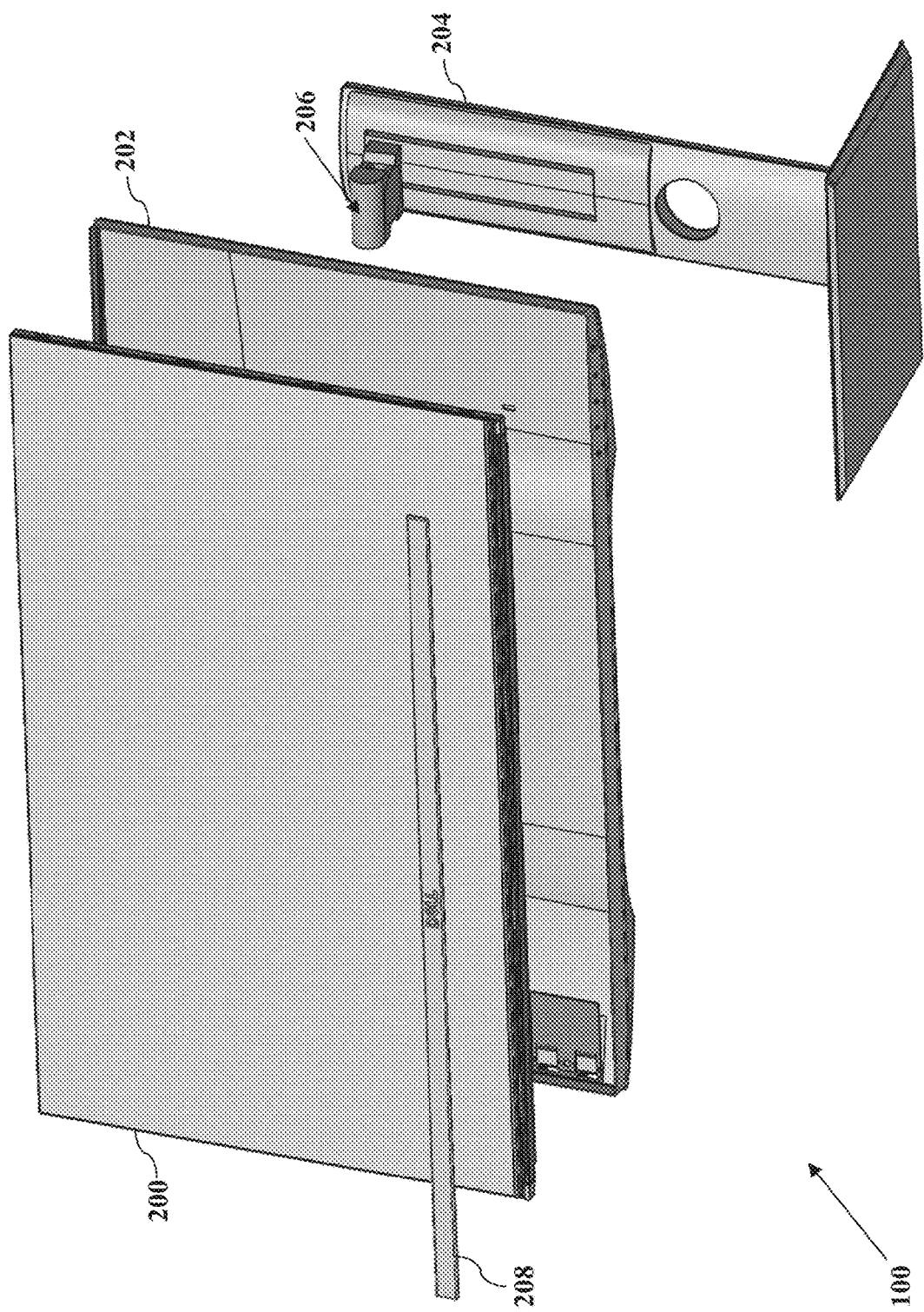
Figure 3:
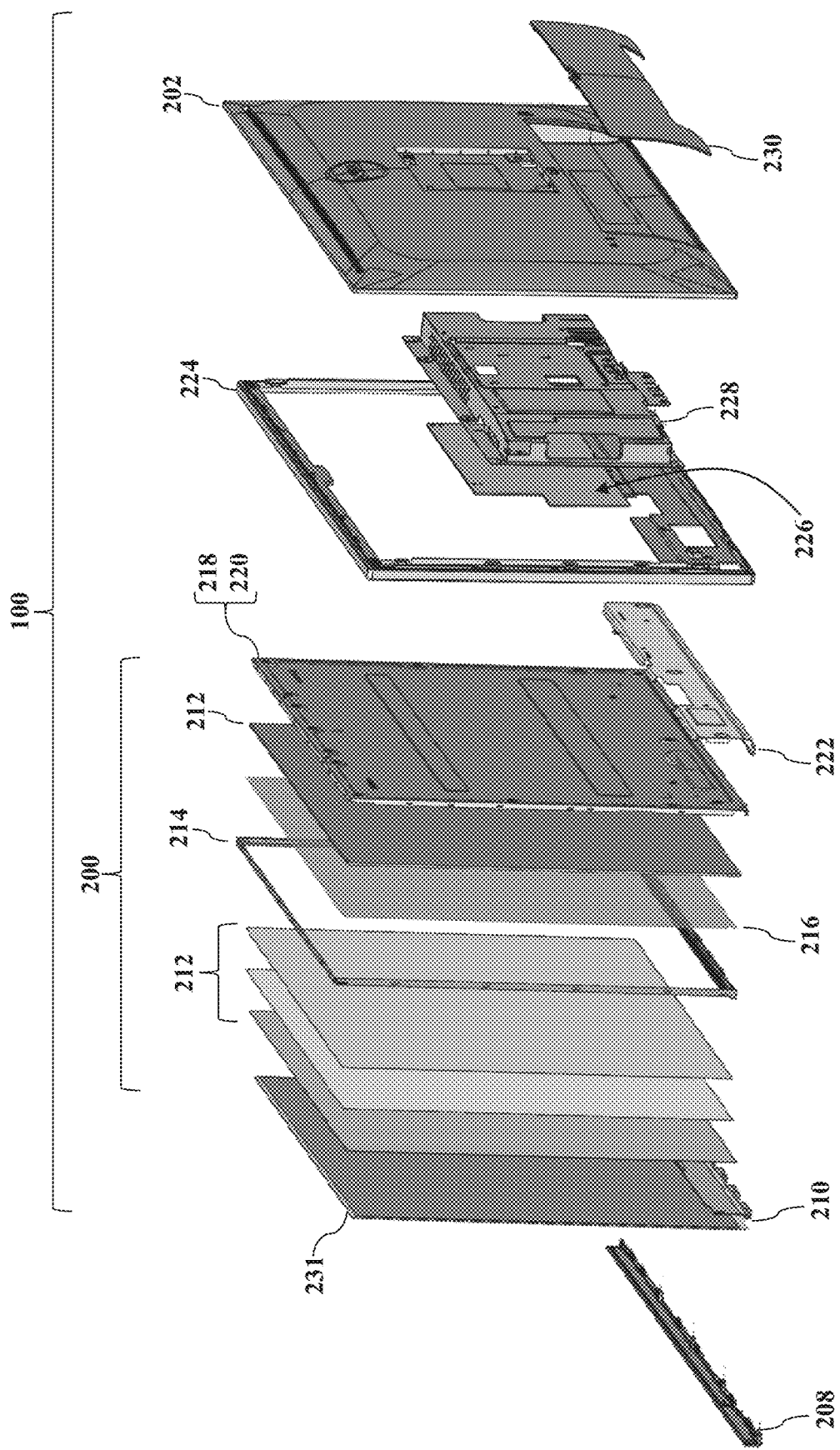

FIGS. 1A-C, 2, and 3 are illustrations of a display device 100, according to exemplary embodiments. FIGS. 1A-C illustrate, respectively, front, top, and side orthographic views of the display device 100. FIGS. 2-3 illustrate exploded assembly views of the display device 100. The display device 100, in general, has a display module 200 that mates with, or inserts into, a rear cover 202. A stand 204 attaches to the rear cover 202. The stand 204 may have a sliding hinge 206 that permits a user to adjust a viewing angle and height. One or more decorative features (such as a branding strip 208) may be applied to an outer or exterior display surface/glass. FIGS. 2-3 particularly illustrate an example of a so-called edge-to-edge display module 200 having little or no boundary, border, and/or bezel.

FIG. 3 shows that the display device 100 may include several components. The display module 200 may include an open cell 210 (such as an LCD), various optical films or sheets 212, a guide panel 214, and a light guide path 216. The display device 100 may also include a bottom cover 218 (perhaps including a backlight 220), a cover shield 222, a middle frame 224, a scaler board 226, a metal shield 228, the rear cover 202, and an access cover 230. Various decorative features (such as the branding strip 208) may be applied to any outer or exterior surface.

The display module 200 may utilize any pixel technology. As the reader may understand, the display module 200 (such as the open cell 210) may utilize thousands, millions, or even billions of addressable picture elements (or pixels) 231. Each picture element 231 may be individually activated with electrical power (such as on, off). Each picture element 231 may even emit an electromagnetic output, perhaps at different optical wavelengths/frequencies that correspond to different colors. While most readers are familiar with liquid crystal displays (LCD) and light emitting diodes (LED), the display module 200 may utilize any pixel technology. A conventional LCD monitor or television, for example, may use the open cell illuminated by the backlight 220 composed of LEDs.

Figure 4:
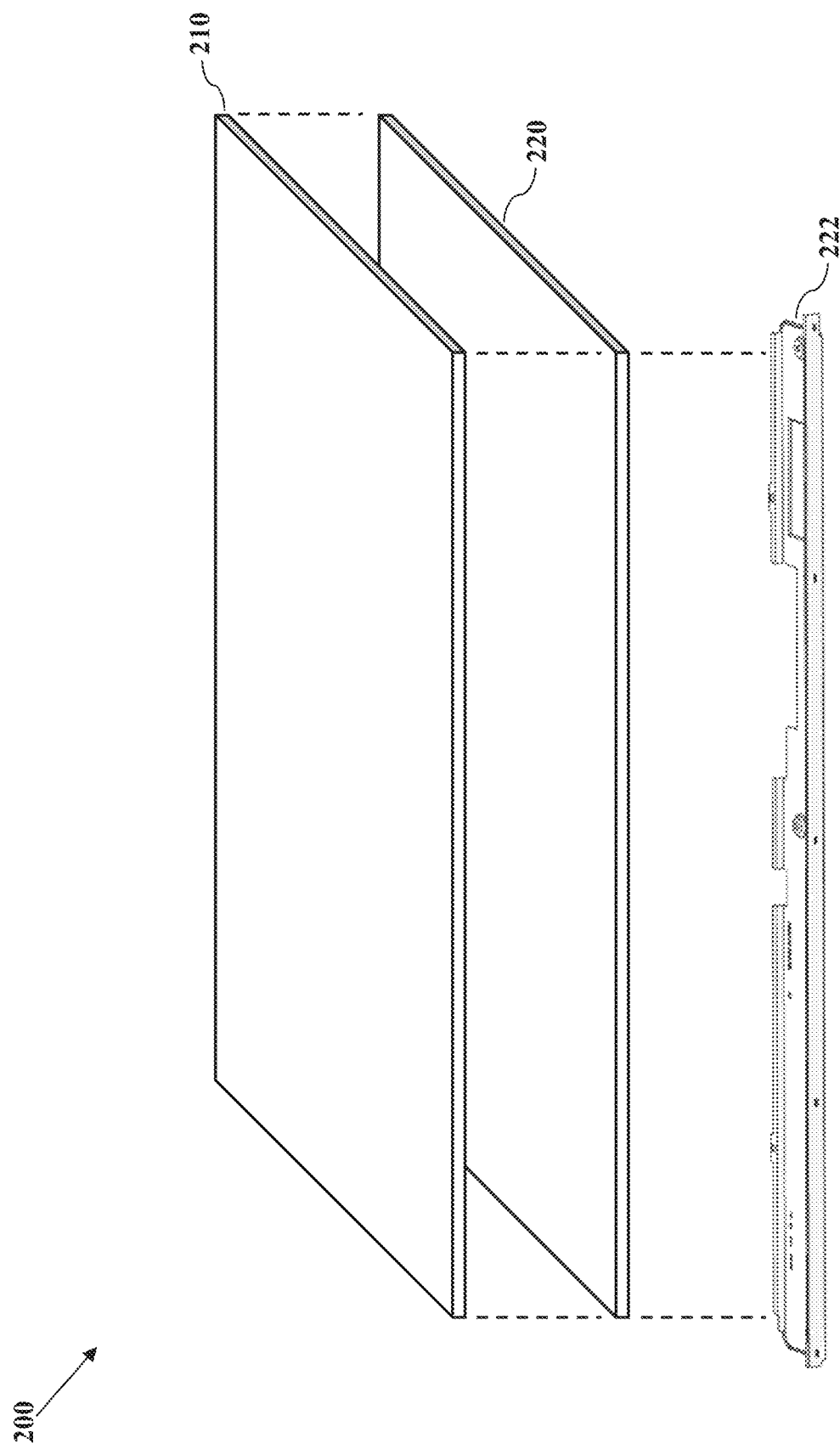
FIGS. 4-5 illustrate a display module, according to exemplary embodiments.
Figure 5:
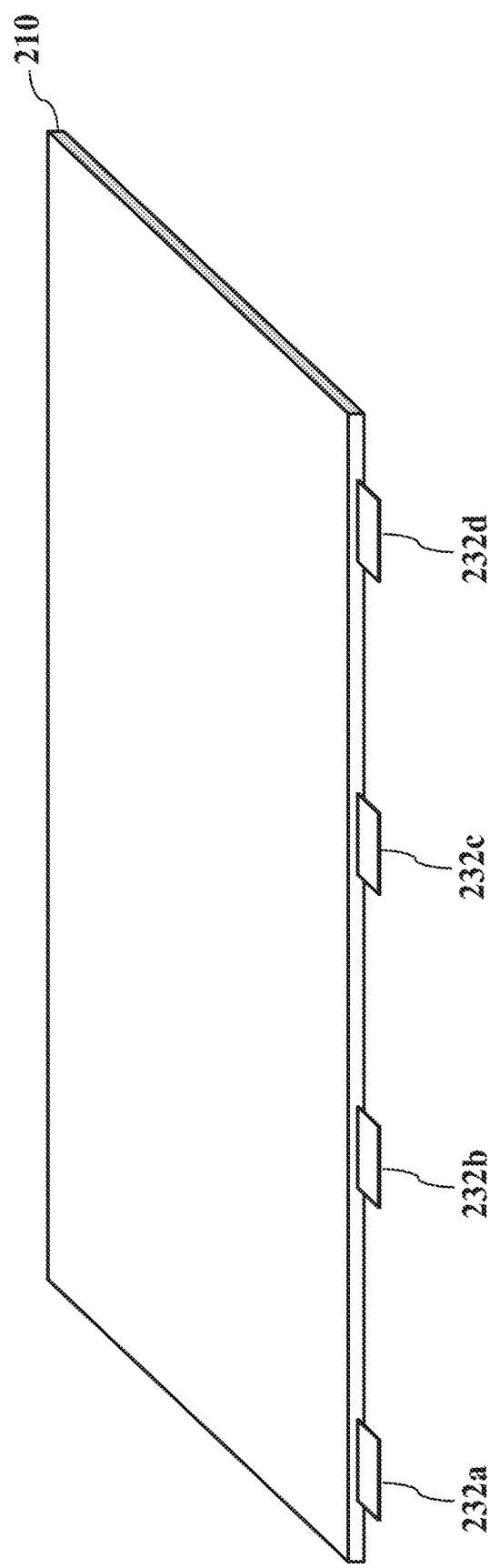

FIGS. 4-5 further illustrate the display module 200, according to exemplary embodiments. The display module 200 is particularly illustrated has the open cell 210 (such as a layer of the picture elements) with the picture elements arranged in a grid or cell having a resolution (depending on a row/column number of the picture elements). The display module 200 may further include the backlight 220, depending on the pixel technology (such as an LCD). The open cell 210 and/or the backlight 220 may mate with, snap or insert into, or rest upon the lower cover shield 222. Moreover, as FIG. 5 illustrates, the open cell 210 may have one or more electrical connections 232. While there may be any number of the electrical connections 232, FIG. 5 illustrates five (5) electrical connections 232a-e. In addition, because there may be millions or even billions of the picture elements within the open cell 210, each electrical connection 232 may receive and deliver electrical power (current and/or voltage) and/or control signals to a corresponding group of the picture elements. Any of the electrical connections 232 may be a male/female socket or plug arrangement. Any of the electrical connections 232 may additionally or alternatively be a chip-on-flex (COF) or direct chip attachment (DCA).

Figure 6:
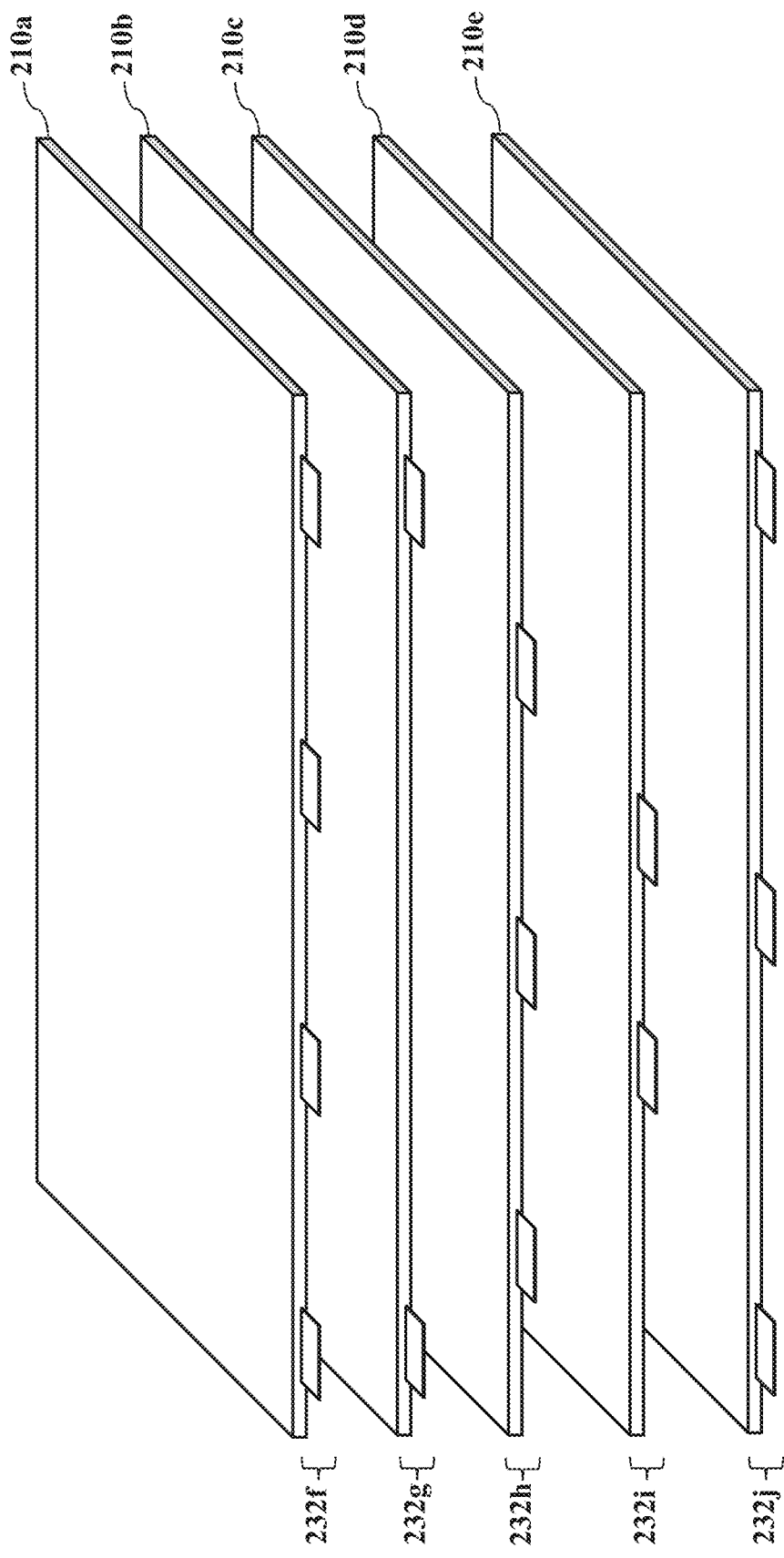
FIG. 6 illustrates variability in the display module.

FIG. 6 illustrates supplier variability in the display module 200. Because there may be multiple suppliers for the open cell 210, each supplier may manufacture its corresponding open cell 210 with different positions, quantities, and/or structures for the electrical connections 232. FIG. 6, for example, illustrates a vertical arrangement of five (5) different open cells 210a-e sourced from five (5) different suppliers. As FIG. 6 further illustrates, each different open cell 210a-e may have a different placement and/or quantity of the electrical connections (illustrated as reference numerals 232f-j). When the five (5) different open cells 210a-e are compared, one sees that the different open cells 210a-e have different numbers and/or locations of the electrical connections 232f-j. This physical variability between the five (5) different open cells 210a-e has conventionally forced an assembler to utilize different assembly fixtures, depending on the particular supplier of the particular open cell 210a-e.

Figure 7C:
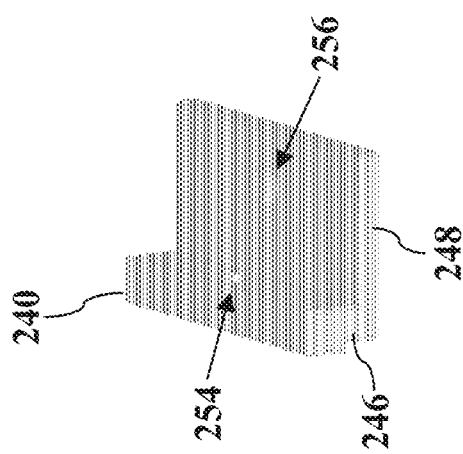
FIGS. 7A-C, 8, 9 and 10 illustrate fixture features that compensate for variability, according to exemplary embodiments.
Figure 7B:
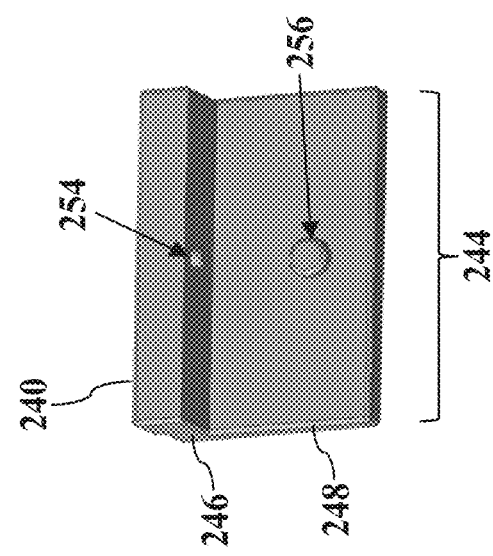
Figure 7A:
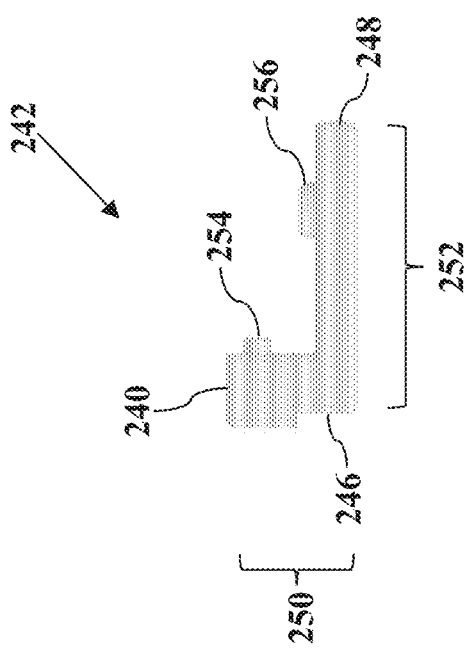

FIGS. 7A-C illustrate fixture features that compensate for supplier variability, according to exemplary embodiments. FIGS. 7A-C, for example, illustrate a modular fixture 240 that may account for design variability in the open cells 210 sourced from different suppliers. FIG. 7A illustrates a side view of the modular fixture 240, while FIGS. 7B-C illustrate orthographic views of the modular fixture 240. FIG. 7A illustrates the modular fixture 240 having a generally "L"-shape 242, with FIGS. 7B-C illustrating a width 244. The modular fixture 240 has a body portion 246 and a generally orthogonal arm portion 248. The body portion 246 has a height 250 and the arm portion 248 has a depth 252. A first pin, peg, nub, or dowel 254 protrudes from an inner/right surface of the body portion 246. A second pin, peg, nub, or dowel 256 protrudes from an inner/upper surface of the arm portion 248. A height, diameter, thickness, and/or material of the pin, peg, nub, or dowels 254 and 256 may be chosen to suit any assembly fixture and/or any supplier's open cell 210.

Figure 8:
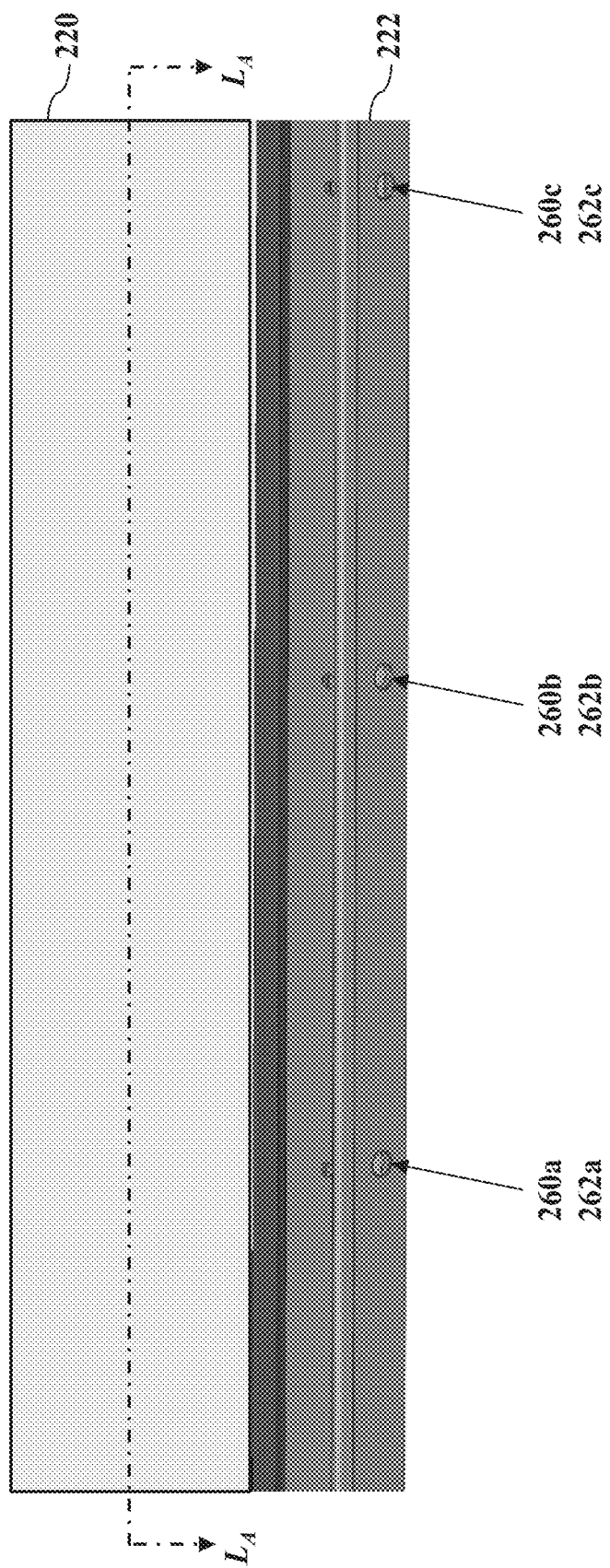
Figure 9:
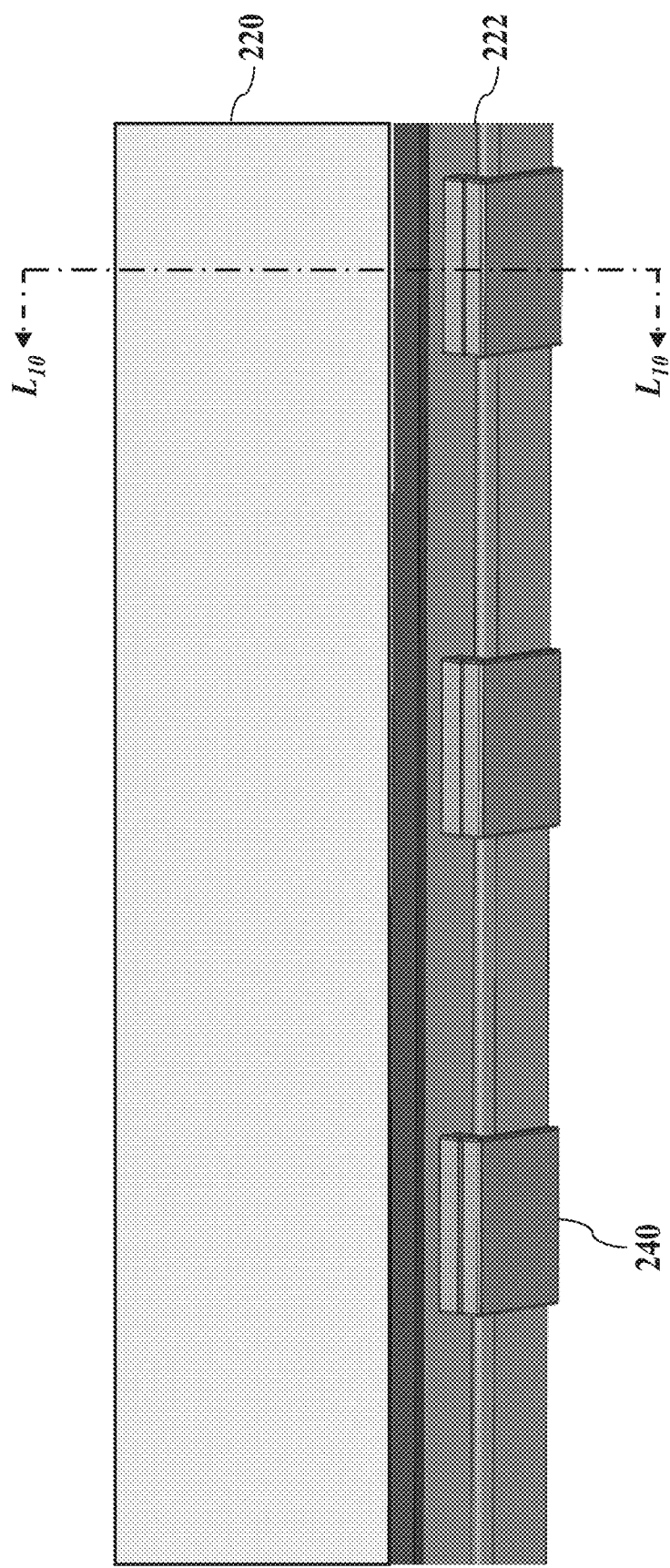
Figure 10:
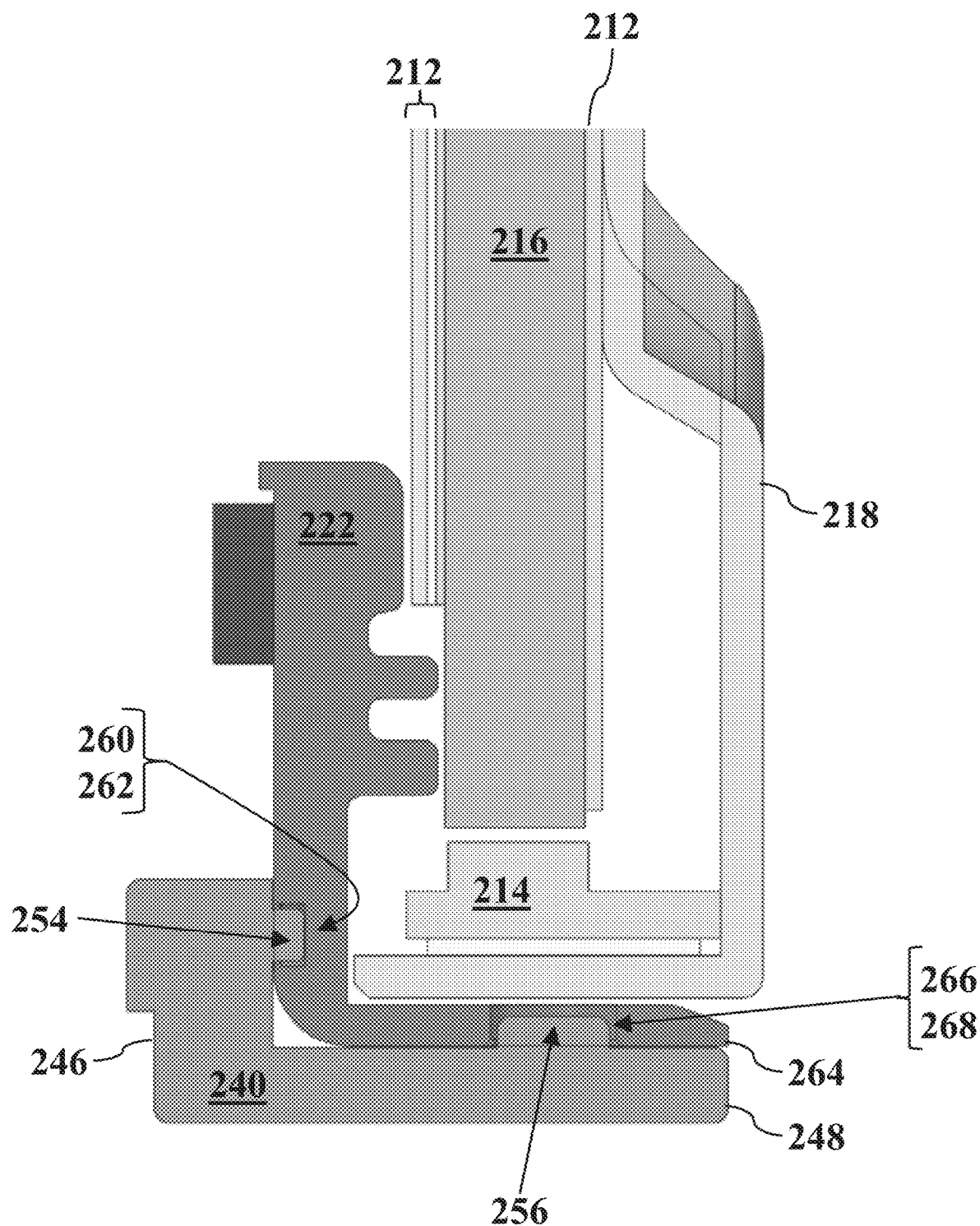

FIGS. 8-10 illustrate an alignment between the backlight 220, the modular fixture 240, and the cover shield 222. FIGS. 8-9, for example, are partial views of the backlight 220 installed within or to the cover shield 222. FIG. 10 is a sectional view of the display module 200 installed within or to the cover shield 222 taken along line $L_{10}$-$L_{10}$ of FIG. 9. As FIG. 8 best illustrates, the cover shield 222 may include one or more alignment features 260 along a longitudinal axis $L_A$-$L_A$. Each alignment feature 260 mates or seats with the modular fixture 240. Each alignment feature 260, for example, may be a hole or other receptacle 262 that aligns with or accepts the pin, peg, nub, or dowel 254 that protrudes from the body portion 246 of the corresponding modular fixture 240. While the cover shield 222 may many alignment features 260, FIG. 8 only illustrates three (3) alignment features 260a-c. As FIG. 10 best illustrates, the alignment features 260 in the cover shield 222 accept the pin, peg, nub, or dowel 254 that protrudes from the modular fixture 240. Moreover, the cover shield 222 may include a lower or bottom material wrap 264 that also includes additional alignment features 266. Each additional alignment feature 266 may mate or seat with the modular fixture 240. Each additional alignment feature 266 may be a hole or other receptacle 268 that aligns with or accepts the pin, peg, nub, or dowel 256 that protrudes from the arm portion 248 of the modular fixture 240.

Exemplary embodiments thus present an elegant solution. Because there may be different suppliers for the open cell 210, each vendor has its own design rules for the quantity and/or position(s) of the electrical connection(s) 232 (as explained with reference to FIG. 6). An assembler of the overall display device 100 may thus require a unique tooling, fixture, or mold for the backlight 220 to compensate for each supplier's cell design (to match its corresponding structure). Each modular fixture 240, though, allows a common backlight mold to be used despite the different cell designs supplied by different vendors. Any number, and any locations, of the modular fixtures 240 may be applied where desired depending on assembly criteria. Moreover, each modular fixture 240 may be inserted, adhered to, placed, or slid along the cover shield 222 to align with the alignment features 260 and 266.

Figure 11A:
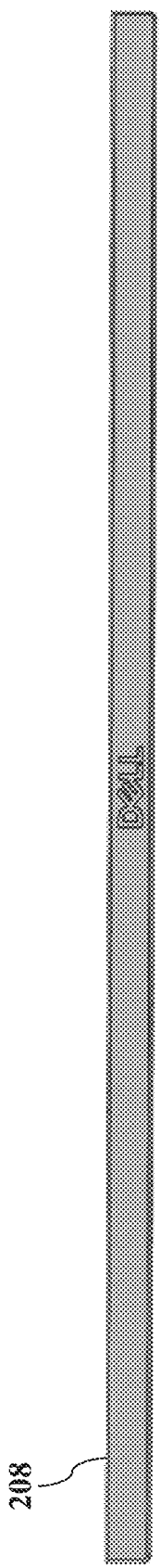
FIGS. 11A-B, 12A-B, and 13 illustrate a modular fixture applied to a decorative feature, according to exemplary embodiments.
Figure 11B:
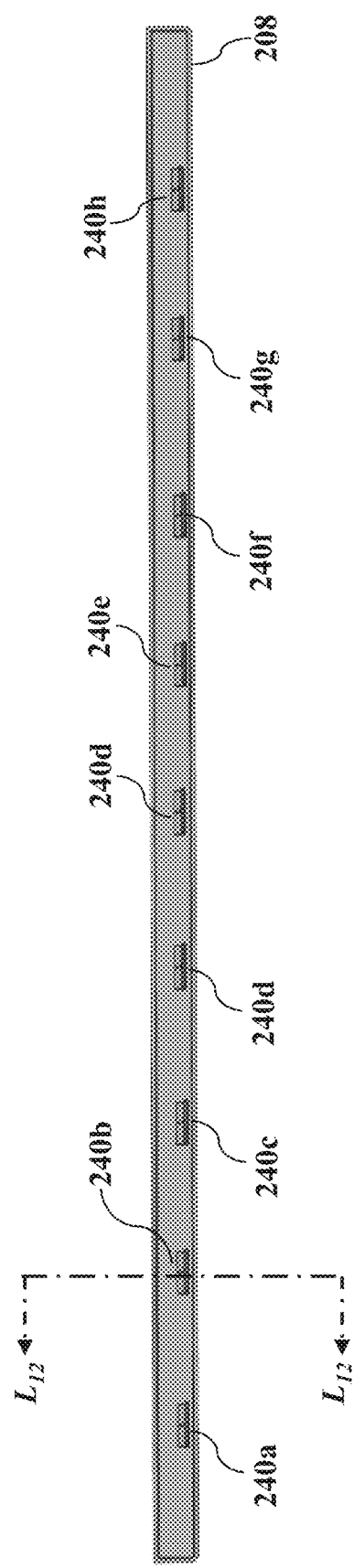
Figure 12B:
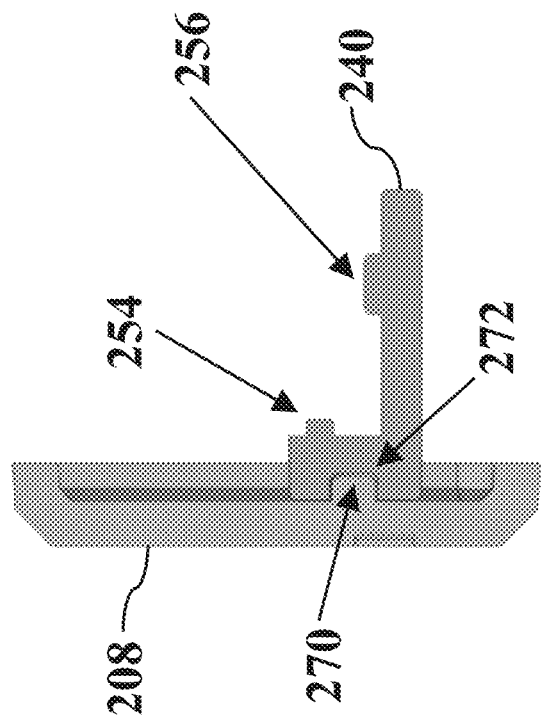
Figure 12A:
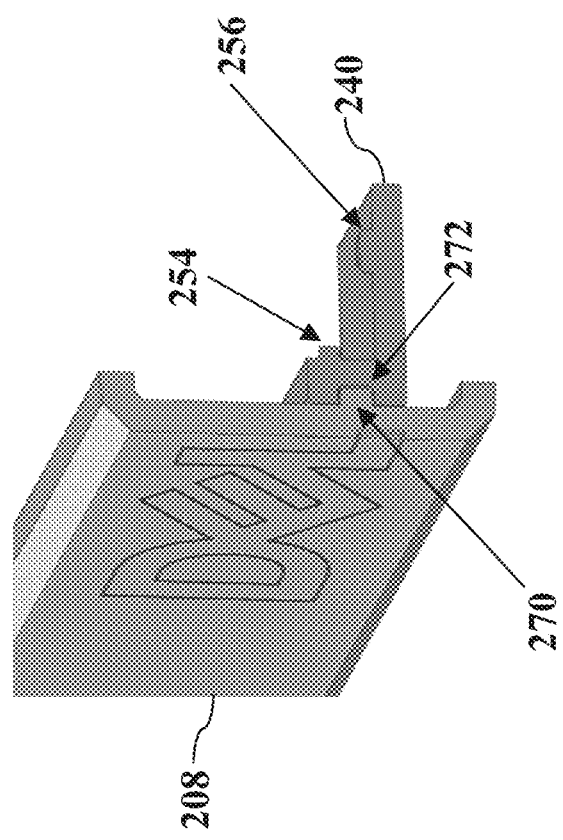
Figure 13:
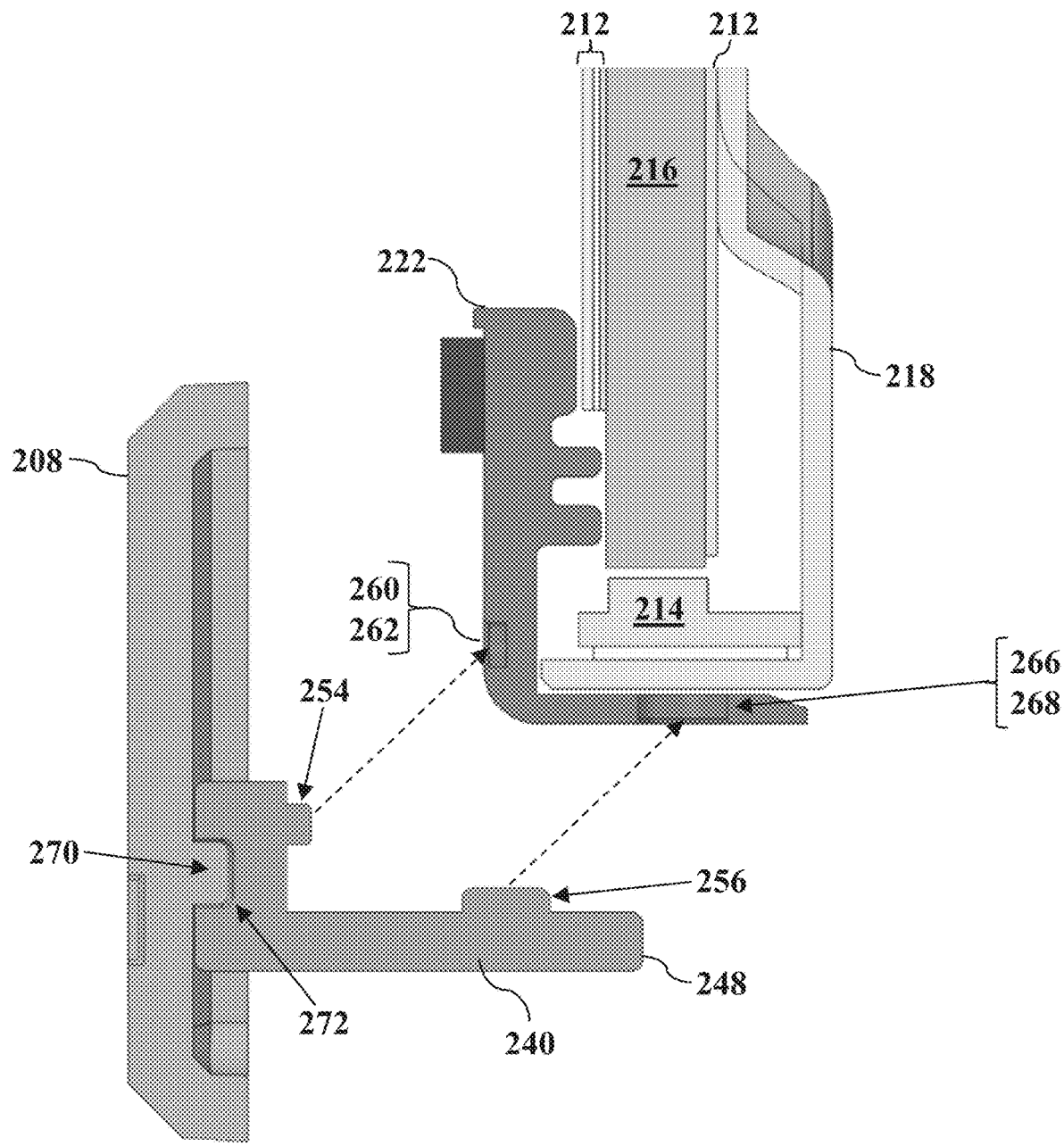

FIGS. 11A-B, 12A-B, and 13 illustrate the modular fixture 240 applied to the decorative features (such as the branding strip 208), according to exemplary embodiments. FIG. 11A illustrates a front or outer view of the branding strip 208, FIG. 11B illustrates a rear/back or inner view of the branding strip 208, and FIGS. 12A-B are sectional views of the modular fixture 240 affixed to the branding strip 208 taken along line $L_{12}$-$L_{12}$ of FIG. 11B. As FIG. 11B illustrates, multiple modular fixtures (illustrated as 240a-h) may outwardly protrude from a backside of the branding strip 208. As FIGS. 12A-B illustrate, the branding strip 208 may have a protruding rib, key, or ridge 270 that mates to, aligns with, or inserts into a trough, notch, groove, or channel 272 in a frontal surface of the body portion 246 of the modular fixture 240. FIG. 13 illustrates and exploded assembly view again illustrating the modular fixture 240 mating with the cover shield 222. The alignment features 260 in the cover shield 222 accept the pin, peg, nub, or dowel 254 that protrudes from the modular fixture 240. Moreover, the additional alignment feature 266 (such as the receptacle 268) aligns with or accepts the pin, peg, nub, or dowel 256 that protrudes from the arm portion 248 of the modular fixture 240. The modular fixture 240 may be pre-applied or preassembled to the decorative branding strip 208, thus allowing a vendor/supplier to preassemble the modular fixture 240 to the decorative branding strip 208.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A display module, comprising:
   an open cell having picture elements;
   a backlight for illuminating the picture elements of the open cell;
   a lower cover shield mating with a bottom edge of the open cell, the lower cover shield having a bottom longitudinal edge and a receptacle along the bottom longitudinal edge; and
   a sliding "L"-shaped modular fixture having a sliding alignment feature sliding along the bottom longitudinal edge of the lower cover shield into an alignment with the receptacle along the lower cover shield.

2. The display module of claim 1, wherein the sliding "L"-shaped modular fixture further comprises a protruding pin as the sliding alignment feature that slides along the bottom longitudinal edge of the lower cover shield into the alignment with the receptacle along the lower cover shield.

3. The display module of claim 1, wherein the lower cover shield has multiple receptacles along the bottom longitudinal edge.

4. The display module of claim 1, wherein the sliding "L"-shaped modular fixture further comprises multiple alignment features.

5. The display module of claim 1, wherein the sliding "L"-shaped modular fixture further comprises an additional alignment feature.

6. The display module of claim 1, wherein the sliding "L"-shaped modular fixture further comprises an additional alignment feature that is orthogonal to the sliding alignment feature.

7. The display module of claim 1, wherein the picture elements comprise liquid crystals.

8. The display module of claim 1, wherein the backlight comprises liquid crystals.

9. The display module of claim 1, wherein the backlight comprises light emitting diodes.

10. The display module of claim 1, further comprising an optical film.

11. The display module of claim 1, further comprising a decorative branding strip.

12. The display module of claim 1, further comprising a decorative branding strip affixed to the modular fixture.

13. A display device, comprising:
   an open cell having picture elements;
   a backlight for illuminating the picture elements of the open cell;
   a lower cover shield mating with a bottom edge of the open cell, the lower cover shield having a bottom longitudinal edge and a receptacle along the bottom longitudinal edge;
   a sliding "L"-shaped modular fixture having a sliding alignment feature sliding along the bottom longitudinal edge of the lower cover shield into an alignment with the receptacle along the cover shield; and
   a rear cover mating with the lower cover shield.

14. The display device of claim 13, further comprising a stand supporting the rear cover.

15. The display device of claim 13, further comprising a stand pivotably attached to the rear cover.

16. The display device of claim 13, further comprising a pin that protrudes from the sliding "L"-shaped modular fixture as the sliding alignment feature.

17. The display device of claim 13, further comprising multiple receptacles in the lower cover shield.

18. The display device of claim 13, further comprising multiple alignment features in the lower cover shield.

19. The display device of claim 13, wherein the picture elements comprise liquid crystals.

20. A display module, comprising:
   an open cell having picture elements;
   a backlight for illuminating the picture elements of the open cell;
   a lower cover shield mating with a bottom edge of the open cell, the lower cover shield having a bottom longitudinal edge and a plurality of receptacles along the bottom longitudinal edge; and
   a sliding "L"-shaped modular fixture having a sliding protruding pin sliding along the bottom longitudinal edge of the lower cover shield into an alignment with a receptacle of the plurality of the receptacles.

\* \* \* \* \*